(12) United States Patent
Moga et al.

(10) Patent No.: US 8,041,898 B2
(45) Date of Patent: Oct. 18, 2011

(54) METHOD, SYSTEM AND APPARATUS FOR REDUCING MEMORY TRAFFIC IN A DISTRIBUTED MEMORY SYSTEM

(75) Inventors: Adrian Moga, Portland, OR (US); Rajat Agarwal, Beaverton, OR (US); Malcolm Mandviwalla, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 652 days.

(21) Appl. No.: 12/113,268

(22) Filed: May 1, 2008

(65) Prior Publication Data

US 2009/0276581 A1  Nov. 5, 2009

(51) Int. Cl.
G06F 12/08 (2006.01)

(52) U.S. Cl. .................. 711/141; 711/145; 711/E12.008

(58) Field of Classification Search .................. 711/141, 711/144, 145, 146, 155, E12.008
See application file for complete search history.

(56) References Cited

U.S. PATENT DOCUMENTS

| | | | |
|---|---|---|---|
| 6,654,858 B1 | 11/2003 | Asher et al. | |
| 7,051,163 B2 | 5/2006 | Van Doren et al. | |
| 7,475,321 B2 * | 1/2009 | Gurumurthi et al. | 711/141 |
| 2006/0156155 A1 * | 7/2006 | Gurumurthi et al. | 714/746 |
| 2008/0005485 A1 * | 1/2008 | Gilbert et al. | 711/146 |

* cited by examiner

Primary Examiner — Pierre-Michel Bataille
(74) Attorney, Agent, or Firm — Grossman, Tucker, Perreault & Pfleger, PLLC

(57) ABSTRACT

The present disclosure provides a method for reducing memory traffic in a distributed memory system. The method may include storing a presence vector in a directory of a memory slice, said presence vector indicating whether a line in local memory has been cached. The method may further include protecting said memory slice from cache coherency violations via a home agent configured to transmit and receive data from said memory slice, said home agent configured to store a copy of said presence vector. The method may also include receiving a request for a block of data from at least one processing node at said home agent and comparing said presence vector with said copy of said presence vector stored in said home agent. The method may additionally include eliminating a write update operation between said home agent and said directory if said presence vector and said copy are equivalent. Of course, many alternatives, variations and modifications are possible without departing from this embodiment.

15 Claims, 3 Drawing Sheets

# METHOD, SYSTEM AND APPARATUS FOR REDUCING MEMORY TRAFFIC IN A DISTRIBUTED MEMORY SYSTEM

FIELD OF THE DISCLOSURE

The present disclosure generally relates to a computer system, and, more particularly, to a method, system and article for reduction of memory traffic in a computer system.

BACKGROUND

In some multi-socket distributed memory systems each socket may include its own home agent. The home agent may guard the memory local to the socket against cache coherency violations, i.e., those impacting the integrity of data stored in the local caches of a shared resource. Cache coherency protocols may be used to ensure that no processor relies on a memory block that has become stale, often due to a modification or update performed to the block by some other processor. There are two typical classes of snooping protocols to maintain cache coherency, directory-based and snooping. In a directory-based protocol, the sharing status of all blocks may be kept in a centralized location or directory. In this case, sharing status may not be maintained in the individual caches. In snooping-based protocols, the caches may monitor or snoop all transactions appearing on the system network interconnecting various system modules. A particular snooping protocol may be source broadcast, home broadcast, or home directory based snooping.

A directory may include a presence vector "PV" that may indicate whether a line in local memory has been cached in any of the sockets. When a particular home agent receives a request for a memory line from the local or remote socket, it may request the presence vector "PV" from the directory in memory, and send out snoops to only those sockets that the PV indicates are caching the line. As such, the directory may help in reducing the snoop traffic considerably. However, this savings in snoop traffic may create an increase in memory write traffic. This increase in write traffic may be due to a modification of the PV that requires updating the directory so that the directory has the correct PV for subsequent requests for the line. For example, a PV may change due to a change in line ownership/sharing. This PV update traffic may create a significant memory bandwidth bottleneck resulting in lower system performance.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The terms "snoop" and "snooping" as used herein, may refer to the process by which a device in a system determines whether a foreign cache stores a particular item of data.

Generally, this disclosure describes a system to reduce memory write traffic due to directory updates. The system may include a home agent having a directory cache configured to reduce the latency to access frequently used entries from the directory. In some embodiments the system described herein may eliminate and/or reduce the need for presence vector update traffic between a home agent and memory if the updated presence vector value at the directory cache of the home agent and the original presence vector in the directory are the same.

Figure 1:
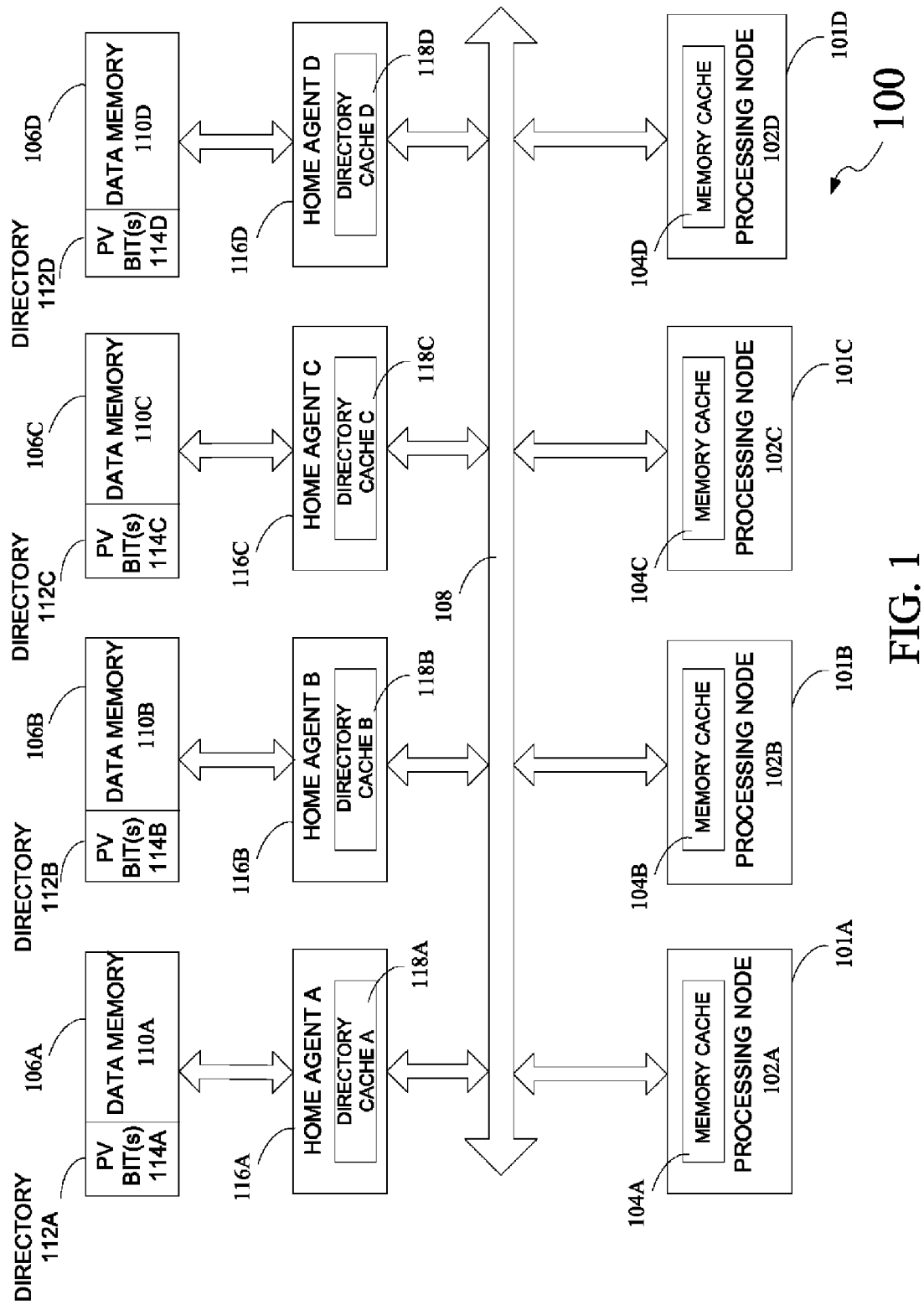
FIG. 1 is a schematic diagram depicting an exemplary processing system in accordance with an exemplary embodiment of the present disclosure.

FIG. 1 depicts a distributed memory system 100 in accordance with an exemplary embodiment of the present disclosure. Distributed memory system 100 may include a plurality of sockets 101A-D. The term "socket" as used herein may refer to a set of one or more processors having associated cache memory modules to perform various processing tasks. Each socket 101 may include a processing node 102 and a memory cache 104. For example, socket 101A may include processing node 102A and memory cache 104A. However, alternative embodiments are also envisioned such as including each memory slice 106 and home agent 116 (described in further detail below) within a particular socket. In this case, memory slice 106A, home agent 116A, and processing node 102A would all be within a particular socket.

Processing nodes 102A-D may include a variety of different devices, e.g., microcontrollers, microprocessors, etc. Examples of the memory caches 104A-104D (hereinafter collectively referred to as 'memory cache 104') may include Random Access Memory (RAM), Dynamic RAM (DRAM), Static RAM (SRAM), and the like. Processing node 102 may include additional and/or alternative types of memory.

Processing nodes 102A-D may communicate with memory slices 106A-106D through the interconnection mechanism 108. For example, the processing nodes 102A-D may communicate with each memory slice 106A-D to perform operations, such as memory read operations, memory write operations, and the like. Processing nodes 102A-D may also perform operations such as accessing a particular location in the memory slice 106 through the interconnection mechanism 108. Some examples of the interconnection mechanism 108 may include Quick Path Interconnect (QPI) bus, Industry Standard Architecture (ISA) bus, NuBus, Hyper Transport, and the like.

Each memory slice 106A-D may include a data memory portion 110 and a directory 112. The data memory 110 may be configured to store data, such as executable instructions, values of variables, and the like. In some embodiments, data memory 110 may be organized into blocks of data that may be read from or written into the data memory 110 by the processing nodes 102 while performing various operations. The blocks of data of the data memory 110 will hereinafter be referred to as 'data memory blocks'. Examples of memory slices 106A-D may include, but are not limited to, a DRAM, an SRAM, an SDRAM, a Flash memory, a Read Only Memory (ROM) and a cache memory. Of course, other types of memory are also within the scope of the present disclosure.

The status of each data memory block may be stored in the directory 112. Directory 112 may include directory entries corresponding to the data memory blocks of its corresponding data memory 110. For example, directory 112A may include directory entries corresponding to data memory blocks of data memory 110A. Each directory entry may maintain the status of the each data memory block in the form of a presence vector. The presence vector may include at least one bit to indicate whether a line in data memory 106 has been cached in any of the processing nodes.

Each of Memory slices 106A-106D may include a directory that contains a presence vector "PV" 114 for each memory block in the memory slices. Each PV bit 114 may be located within directory 112 and may indicate whether a line in local memory has been cached in any of the sockets 101. For example, PV bit 114A may be stored within directory 112A, PV bit 114B may be stored within directory 112B, etc.

Each individual memory slice 106A-106D may be protected by a corresponding home agent 116A-D. For example, memory slice 106A may be protected by home agent 116A, memory slice 106B may be protected by home agent 116B, etc. Home agent 116 may be configured to protect its corresponding memory slice from cache coherency violations (i.e., those impacting the integrity of data stored in the local caches of a shared resource).

In an exemplary embodiment, each home agent 116 of system 100 may include a corresponding directory cache 118. In some embodiments, directory cache 118 may be a writeback cache, which may be configured to store updated data until a particular time. Further, a write-back or victim buffer may also be provided in addition to the directory cache. Of course, other types of memory are also within the scope of the present disclosure.

As discussed above, the PV bit 114 may be associated with directory 112 and may indicate whether a line has been cached in any of sockets 101. For example, a logic level of '1' of the bit in the presence vector of directory 112A may represent that the data memory block is cached by memory cache 104A of socket 101A. However, it will be apparent to a person skilled in the art that the bit may also be set to a logic level '0' to indicate caching of the data memory block. Further, more than one bit may be associated with each directory entry to indicate the status of the data memory block in various sockets.

In conventional systems, during requests that require snooping, a particular home agent may not begin snooping until the PV bit is read from memory, which may induce an additional latency penalty. To reduce this penalty, the present disclosure includes a directory cache 118 implemented at home agent 116 that may cache the PVs of frequently requested lines. In other words, if home agent 116 locates the PV in its own directory cache 118 or elsewhere within home agent 116, it does not need to read from memory slice 106 to determine which nodes to snoop, thus avoiding the latency penalty.

The storage of the PV in home agent 116 may reduce the amount of memory write traffic between home agent 116 and memory slice 106 due to directory updates. The embodiments described herein may eliminate the need to send a PV update to directory 112 (i.e., squash the memory write operation) if the updated PV at home agent 116 and the original PV bit 114 in directory 112 are the same.

In some embodiments, system 100 may be configured to eliminate a variety of different memory write operations. For example, if processing node 102 installs a line in a clean state and later victimizes it silently, directory 112 may still think that the caching agent involved (e.g., memory cache 104) still has the line and the corresponding PV bit 114 may remain set. If subsequently the same cache requests the line again then the same PV bit is set again. This is a redundant operation (i.e., essentially writing a '1' over a '1') as the PV value at the home agent 116 and directory 112 may be the same. Home agent 116 may be configured to determine if the updated PV it has for a particular line is the same as what directory 112 holds for that line. If so, home agent 116 may utilize write squashing circuitry configured to squash a write update operation as is shown in greater detail in FIG. 2.

In some embodiments, alternative presence vector configurations may be employed. For example, instead of a one-bit per socket configuration, the presence vector may be a one-bit total PV that indicates if a particular line has been cached by any of the caching agents. This configuration may provide additional conditions to squash a particular write operation. Once the PV bit has been set an update does not need to be sent to memory unless it is reset to zero (e.g., possibly due to a writeback received for the line). Thus, for workloads that demonstrate sharing/migratory behavior, moving a line from one cache to the other may not require the PV to be updated in the directory for a 1-bit total PV scheme.

Figure 2:
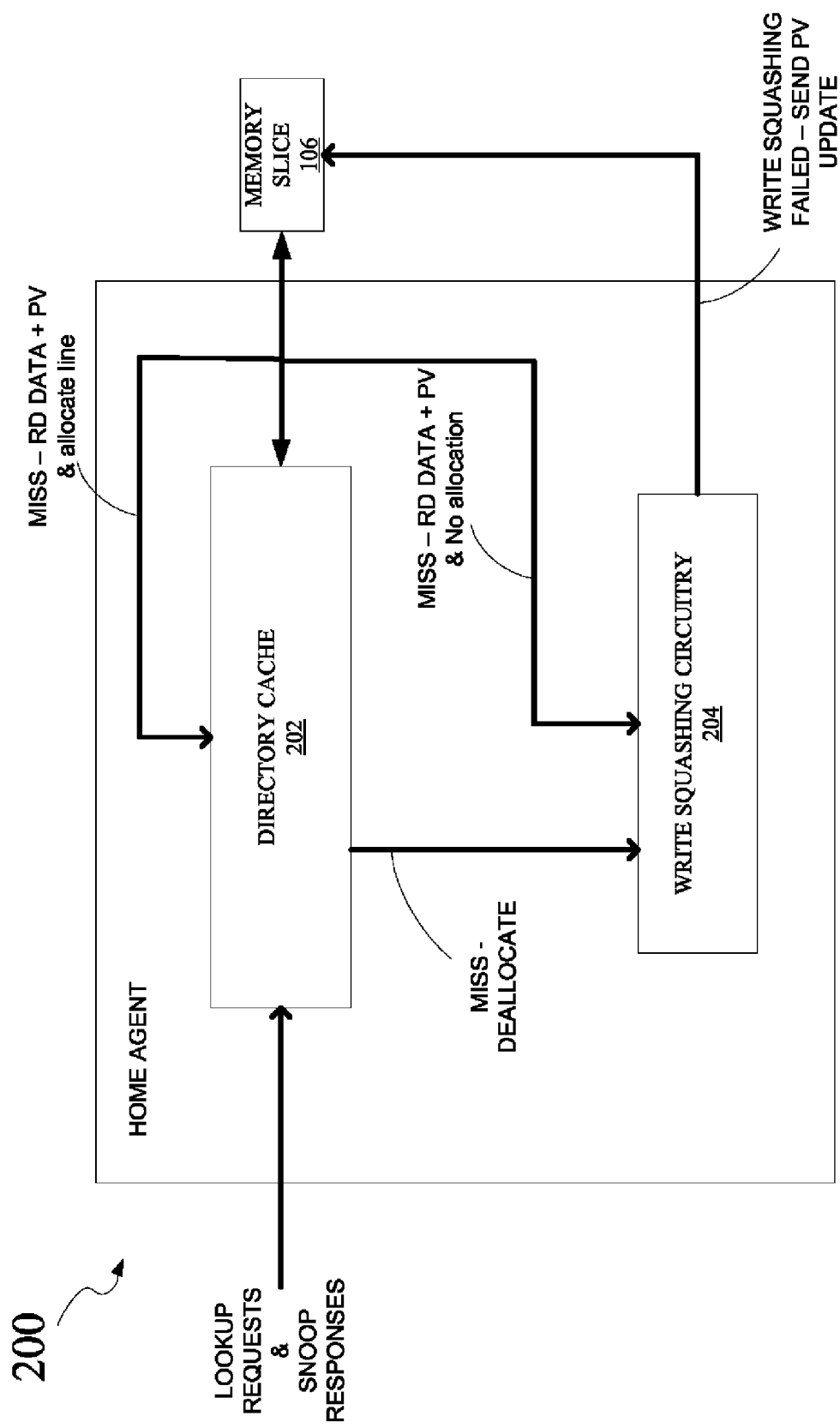
FIG. 2 is a schematic block diagram illustrating a system for reducing memory traffic in a distributed memory system, in accordance with yet another embodiment of the present disclosure.

Referring now to FIG. 2, an exemplary embodiment of a home agent 200 in accordance with the present disclosure is provided. Home Agent 200 may include directory cache 202 and write squashing circuitry 204. Directory cache 202 may be configured to receive lookup requests and snoop responses from various caching agents (e.g., memory cache 104) and may communicate with memory slice 106. Write squashing circuitry 204 may be applied when the PV in directory cache 202 needs to be written back to the directory (i.e., updated). The update may not be eliminated if write squashing circuitry 204 determines that the presence vector at directory cache 202 is equivalent to the presence vector in the directory in memory slice 106. This may be achieved by comparing a copy of the presence vector that was originally read in, or by utilization of a dirty bit as is discussed in further detail below.

In some embodiments, write squashing circuitry 204 may be configured to squash a PV update write to memory in a number of different situations. For example, in one embodiment, a write operation may be squashed if a line in the directory cache 202 storing a particular PV has been victimized. Write squashing circuitry 204 may also squash a write operation if the PV is not allocated in the directory cache 202, or if there is no directory cache. Each of these situations is described in further detail hereinbelow.

In one embodiment, write squashing circuitry 204 may be configured to squash a write if a line in directory cache 202 storing a particular PV has been victimized. For example, a presence vector stored in directory cache 202 may be modified several times before it is victimized. To track if the PV value changed after it was installed in directory cache 202, a single bit called a "dirty bit" may be used. The dirty bit may be located in a number of locations, such as, for example, within home agent 200 and may be set the moment the PV value changes. In one embodiment, each line in the directory cache may have an associated dirty bit. When a particular line is selected for victimization, this dirty bit may be checked. If the bit is set an update write may be sent to the directory in memory. If the bit is cleared the update write may be dropped. Alternatively, the entire original PV may be stored and compared with the updated PV before sending the write update.

In some embodiments, write squashing circuitry 204 may be configured to squash a write if the presence vector is not allocated in directory cache 202 or if there is no directory cache. Here, home agent 200 may need to temporarily buffer the PV while it snoops the nodes and collects the responses. Based on the original request and the responses received a new PV may be formulated. If this PV and the original PV (that was buffered temporarily) are the same then no update write operation may be necessary. However, if the two presence vectors are different an update write may be sent to the memory slice.

In operation, directory cache 202 may be configured to receive lookup requests and snoop responses from various sockets. If the request is not present at directory cache 202, the home agent 200 may read the data and/or presence vector from memory slice 106. Write squashing circuitry 204 may then squash a write operation if a directory cache line storing a presence vector is victimized, if the presence vector is not allocated in the directory cache, or if there is no directory cache. In the event that the write squashing circuitry is unsuccessful the presence vector update may be sent to memory slice 106.

Figure 3:
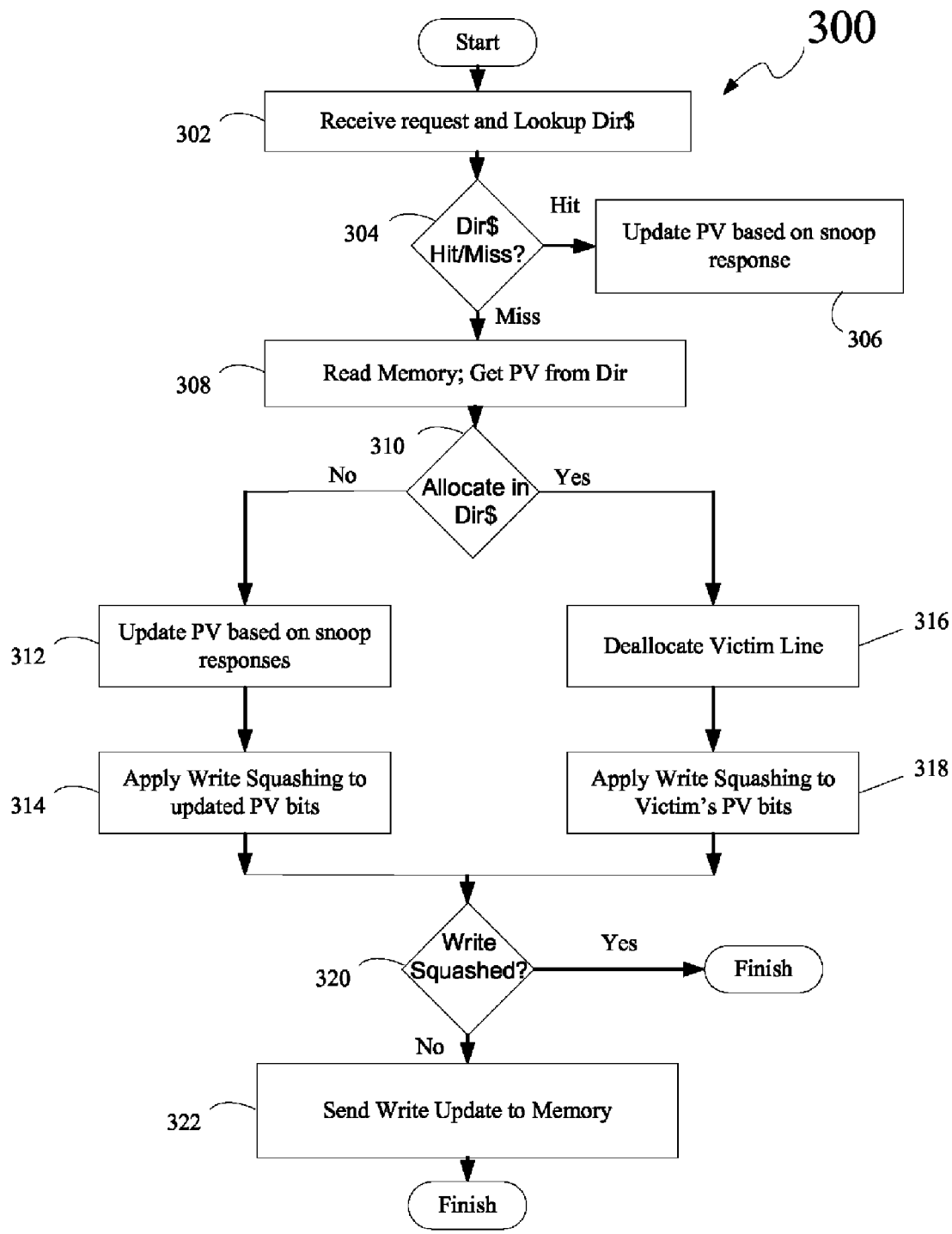
FIG. 3 is a flow diagram representing a method for reducing memory traffic in a distributed memory system, in accordance with another embodiment of the present disclosure.

In some embodiments, the write squashing circuitry 204 may include comparator circuitry (not shown). The comparator circuitry may be capable of comparing a copy of the PV in the memory slice 106 with the PV in the home agent 200 (e.g., directory cache 202). For example, if the status of the data memory block in memory slice 106 does not match the status of the data memory block in the directory cache 202, the write squashing circuitry 204 may update the directory 112 accordingly. Further, when the modified presence vector in the home agent 116 is the same as the PV in the directory, the write squashing circuitry 204 may avoid an unnecessary update in the directory 112, thereby minimizing the amount of traffic between an individual memory slice and its corresponding home agent Referring now to FIG. 3, a flowchart 300 depicting exemplary operations in accordance with the present disclosure is provided. Flowchart 300 depicts the operation of the write squashing circuitry 204 included within home agent 200. Operations may include receiving lookup requests and snoop responses at the directory cache "dir$" (302). Operations may further include determining whether there is a hit or a miss at the directory cache (304). If there is a hit at the directory cache, the presence vector may be updated based upon the snoop response (306). If not, the home agent may read the presence vector from the directory in the memory slice (308). Operations may further include determining whether the presence vector is allocated in the directory cache (310). If the presence vector is not allocated in the directory cache, the presence vector may be updated based upon the snoop responses (312) and write squashing may be applied to the updated presence vector bits (314). Alternatively, if the PV is allocated in the directory cache, the victim line may be dealt located (316) and write squashing may be applied to the victim's PV bits (318). Operations may also include squashing the write update (320) or if the write update operation is not squashed, sending the write update to memory (322). Of course, other operations are also within the scope of the present disclosure.

Further, components of the embodiments described herein, such as the home agent, the write squashing circuitry, the comparator circuitry, etc. may be implemented as hardware modules, software modules, firmware modules, or any combination thereof. As used in any embodiment described herein, "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Furthermore, it will be obvious to those skilled in the art that the embodiments described herein may include requisite electrical connections for communicably coupling the components of the system.

Reducing the memory traffic in a distributed memory system as described herein may be advantageous in that it may increase the overall speed of the system. The inclusion of a directory cache within each home agent may enable faster read and write operations on a memory slice (e.g., memory slice 106A). The system and method described herein may also enable the reduction in read and write operations at a given memory slice, thereby reducing memory bandwidth and increasing overall performance of the processing system.

Embodiments of the methods described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. A method for reducing memory traffic in a distributed memory system, said method comprising:
   storing a presence vector in a directory of a memory slice, said presence vector indicating whether a line in local memory has been cached;
   protecting said memory slice from cache coherency violations via a home agent configured to transmit and receive data from said memory slice, said home agent configured to store a copy of said presence vector;
   receiving a request for a block of data from at least one socket at said home agent;
   comparing said presence vector with said copy of said presence vector stored in said home agent; and
   eliminating a write update operation between said home agent and said directory if said presence vector and said copy are equivalent; and
   wherein the home agent includes write squashing circuitry configured to squash the write update operation.

2. The method according to claim 1, further comprising snooping at least one local memory cache of said at least one socket based upon the contents of said directory cache.

3. The method according to claim 1, further comprising storing a presence vector value in said directory cache.

4. The method according to claim 3, further comprising setting a value of a dirty bit if said presence vector value changes.

5. The method according to claim 4, further comprising updating said directory in said memory slice.

6. A system for reducing memory traffic in a distributed memory system, said system comprising:
   a memory slice having a directory configured to store a presence vector, said presence vector indicating whether a line in local memory has been cached;
   at least one socket configured to transmit a request for a memory line;
   a home agent configured to protect said memory slice from cache coherency violations, said home agent configured to transmit and receive data from said memory slice, said home agent configured to store at least one copy of said presence vector, said home agent configured to compare said presence vector with said copy of said presence vector stored in said home agent, said home agent further configured to eliminate a write update operation between said home agent and said directory if said presence vector and said copy are equivalent; and
   wherein the home agent includes write squashing circuitry configured to squash the write update operation.

7. The system according to claim 6, wherein said home agent is further configured to snoop at least one local memory cache of said at least one socket based upon the contents of said directory cache.

8. The system according to claim 6, wherein said presence vector value is distributed among a plurality of memory slices.

9. The system according to claim 8, further comprising a dirty bit configured to be set to a value if said presence vector value changes.

10. The system according to claim 9, wherein said home agent is further configured to update said directory in said memory slice if said dirty bit value is set.

11. An article comprising a storage medium having stored thereon instructions that when executed by a machine result in the following:
    storing a presence vector in a directory of a memory slice, said presence vector indicating whether a line in local memory has been cached;
    protecting said memory slice from cache coherency violations via a home agent configured to transmit and receive data from said memory slice, said home agent configured to store a copy of said presence vector;
    receiving a request for a block of data from at least one socket at said home agent;
    comparing said presence vector with said copy of said presence vector stored in said home agent; and
    eliminating a write update operation between said home agent and said directory if said presence vector and said copy are equivalent; and
    wherein the home agent includes write squashing circuitry configured to squash the write update operation.

12. The article according to claim 11, further comprising snooping at least one local memory cache of said at least one socket based upon the contents of said directory cache.

13. The article according to claim 11, further comprising storing a presence vector value in said directory cache.

14. The article according to claim 13, further comprising setting a value of a dirty bit if said presence vector value changes.

15. The article according to claim 14, further comprising updating said directory in said memory slice.

* * * * *